United States Patent
Krishna

(10) Patent No.: US 8,085,008 B2
(45) Date of Patent: Dec. 27, 2011

(54) SYSTEM FOR ACCOUNTING FOR SWITCH IMPENDANCES

(75) Inventor: Kannan Krishna, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 338 days.

(21) Appl. No.: 12/435,111

(22) Filed: May 4, 2009

(65) Prior Publication Data
US 2010/0277145 A1 Nov. 4, 2010

(51) Int. Cl.
G05F 1/652 (2006.01)
G05F 1/656 (2006.01)
(52) U.S. Cl. .......................................... 323/233
(58) Field of Classification Search ............ 323/233, 323/282, 283, 208
See application file for complete search history.

(56) References Cited

U.S. PATENT DOCUMENTS

| | | | |
|---|---|---|---|
| 6,031,480 A * | 2/2000 | Soenen et al. | 341/161 |
| 6,141,719 A | 10/2000 | Rafferty et al. | |
| 7,039,731 B2 | 5/2006 | Hasegawa | |
| 7,109,795 B2 * | 9/2006 | van Zeijl | 330/254 |
| 7,484,018 B2 | 1/2009 | Szabelski | |
| 2004/0021511 A1 * | 2/2004 | Michalski | 330/9 |
| 2005/0261797 A1 * | 11/2005 | Cyr et al. | 700/121 |
| 2008/0165794 A1 * | 7/2008 | Sutardja et al. | 370/420 |
| 2008/0297265 A1 | 12/2008 | Tarng et al. | |
| 2009/0002085 A1 | 1/2009 | Tarng et al. | |
| 2009/0029733 A1 | 1/2009 | Schilling et al. | |
| 2009/0195304 A1 * | 8/2009 | Bankman et al. | 327/552 |

* cited by examiner

Primary Examiner — Jue Zhang
(74) Attorney, Agent, or Firm — John J. Patti; Wade J. Brady, III; Frederick J. Telecky, Jr.

(57) ABSTRACT

A Universal Serial Bus (USB) switch matrix is provided. The switch matrix generally comprises a switch network, and amplifier, a adjustable current source, and variable resistors. The switch network is able to output a differential output signal and a common mode signal. The amplifier compares the common mode signal to a reference voltage, and the amplifier adjusts the magnitude of the current from the adjustable current source and the resistances of the variable resistors based at least in part on the comparison to adjust the peak-to-peak voltage swing of the output signal.

10 Claims, 1 Drawing Sheet

SYSTEM FOR ACCOUNTING FOR SWITCH IMPENDANCES

TECHNICAL FIELD

The invention relates generally to accounting for switch impedances and, more particularly, to an adaptive system that accounts for switch impedances in Universal Serial Bus (USB) applications.

BACKGROUND

Micro-Universal Serial Bus (USB) connections have become increasingly common. With the increased popularity, the micro-USB ports have been adapted to perform high-speed data transfers and low-speed data transfers, operating as an audio output ports, video ports, battery charging ports, and so forth. Performing this variety of tasks generally requires the use of a multi-port switch. This switch, though, can have a large impedance (about 5Ω) compared to the typical USB terminal impedance of 45Ω. This impedance can seriously degrade the transmitter or output voltage swing at the USB port, which is generally required to have a peak-to-peak (differential) swing of 800 mV with a common mode of 200 mV at a speed of about 480 Mb/s.

Some examples of conventional circuits are U.S. Pat. Nos. 6,141,719; 7,039,731; 7,484,018; U.S. Patent Pre-Grant Publ. No. 2008/0297265; U.S. Patent Pre-Grant Publ. No. 2009/0002085; and U.S. Patent Pre-Grant Publ. No. 2009/0029733.

SUMMARY

A preferred embodiment of the present invention, accordingly, provides an apparatus. The apparatus comprises a switch network having a first output terminal, a second output terminal, a plurality of input terminals, a common mode terminal, a first feedback terminal, and a second feedback terminal, wherein the switch network outputs a differential output signal though the first and second output terminals, and wherein the switch network outputs a common mode signal through the common mode terminal; an amplifier having a first input terminal, a second input terminal, and an output terminal, wherein the first input terminal of the amplifier is coupled to the common mode terminal so as to receive the common mode signal, and wherein the second input terminal of the amplifier receives a reference voltage; a first variable resistor that is coupled between the first feedback terminal and ground, wherein the magnitude resistance of the first variable resistor is based at least in part on an output signal from the output terminal of the amplifier; a second variable resistor that is coupled between the second feedback terminal and ground, wherein the resistance of the second variable resistor is based at least in part on the output signal from the output terminal of the amplifier; and an adjustable current source that is coupled between the first and second feedback terminals, wherein the magnitude of the current from the adjustable current source is based at least in part on the output signal from the output terminal of the amplifier.

In accordance with a preferred embodiment of the present invention, the apparatus further comprises a first feedback switch that is coupled between the adjustable current source and the first feedback terminal; and a second feedback switch that is coupled between the adjustable current source and the second feedback terminal.

In accordance with a preferred embodiment of the present invention, the switch network further comprises a first switch that is coupled between the first output terminal of the switch network and the first feedback terminal; a first set of auxiliary switches, wherein each switch from the first set of auxiliary switches is coupled to the first output terminal of the switch network; a second switch that is coupled between the second output terminal of the switch network and the second feedback terminal; a second set of auxiliary switches, wherein each switch from the second set of auxiliary switches is coupled to the second output terminal of the switch network; a first resistor that is coupled between the first output terminal of the switch network and the common mode terminal; and a second resistor that is coupled between the second output terminal of the switch network and the common mode terminal.

In accordance with a preferred embodiment of the present invention, the first and second resistors are each about 5 kΩ.

In accordance with a preferred embodiment of the present invention, an apparatus for communicating with an external device is provided. The apparatus comprises a switch matrix that is adapted to communicate with the external, wherein the switch matrix includes a switch network having the first output terminal, the second output terminal, a plurality of input terminals, a common mode terminal, a first feedback terminal, and a second feedback terminal, wherein the switch network outputs a differential output signal though the first and second output terminals, and wherein the switch network outputs a common mode signal through the common mode terminal; an amplifier having a first input terminal, a second input terminal, and an output terminal, wherein the first input terminal of the amplifier is coupled to the common mode terminal so as to receive the common mode signal, and wherein the second input terminal receives a reference voltage; a first variable resistor that is coupled between the first feedback terminal and ground, wherein the magnitude resistance of the first variable resistor is based at least in part on an output signal from the output terminal of the amplifier; a second variable resistor that is coupled between the second feedback terminal and ground, wherein the resistance of the second variable resistor is based at least in part on the output signal from the output terminal of the amplifier; and an adjustable current source that is coupled between the first and second feedback terminals, wherein the magnitude of the current from the adjustable current source is based at least in part on the output signal from the output terminal of the amplifier; and a controller that is coupled to the switch matrix, wherein the controller provides control signal to the switch network.

In accordance with a preferred embodiment of the present invention, an apparatus is provided. The apparatus comprises a first switch that is coupled between a first differential output terminal and a first feedback terminal, wherein the first differential output terminal outputs at least a portion of a differential output signal; a first set of auxiliary switches, wherein each switch from the first set of auxiliary switches is coupled to the first output terminal; a second switch that is coupled between a second differential output terminal and a second feedback terminal, where the second differential output terminal outputs at least a portion of the differential output signal; a second set of auxiliary switches, wherein each switch from the second set of auxiliary switches is coupled to the second output terminal; a first resistor that is coupled between the first differential output terminal and a common mode terminal, wherein a common mode signal is output through the common mode terminal; a second resistor that is coupled between the second differential output terminal and the common mode terminal; an amplifier having a first input terminal and a second input terminal, wherein the first input terminal of the amplifier is coupled to the common mode terminal so as to receive the common mode signal, and wherein the second input terminal receives a reference voltage; a first variable resistor that is coupled between the first feedback terminal and ground, wherein the magnitude resistance of the first variable resistor is based at least in part on an output signal from the amplifier; a second variable resistor that is coupled between the second feedback terminal and ground, wherein the resistance of the second variable resistor is based at least in part on the output signal from the amplifier; an adjustable current source, wherein the magnitude of the current from the adjustable current source is based at least in part on the output signal from the output terminal of the amplifier; a first feedback switch that is coupled between the adjustable current source and the first feedback terminal; and a second feedback switch that is coupled between the adjustable current source and the second feedback terminal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
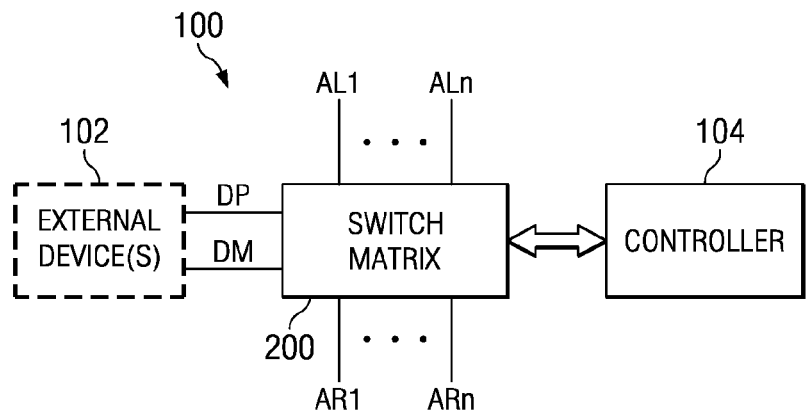
FIG. 1 is a block diagram of a system in accordance with a preferred embodiment of the present invention.

Refer now to the drawings wherein depicted elements are, for the sake of clarity, not necessarily shown to scale and wherein like or similar elements are designated by the same reference numeral through the several views.

Referring to FIG. 1 of the drawings, the reference numeral 100 generally designates a system in accordance with a preferred embodiment of the present invention. The system 100 generally comprises a USB port and external device(s) 102. As shown, the USB port generally comprises a controller 104 and a switch matrix 200. The USB port can, and typically does, include other devices that are not shown, such as USB PHY integrated circuits (ICs).

In operation, signals are received by the switch matrix 200 and output to external device(s) 102. Numerous, different types of signals, such as audio signals, are received through input terminals AL1 through ALn and AR1 through ARn and output through differential output terminals DP and DM. Typically, terminals AL1 through ALn correspond to a positive portion of the differential output signal, which is output through terminal DP, and terminals AR1 through ARn correspond to a negative portion of the differential output signal, which is output through terminal DM. Controller 104 also provides control signals to the switch matrix 200 to actuate and deactuate switches internal to the switch matrix 200.

Figure 2:
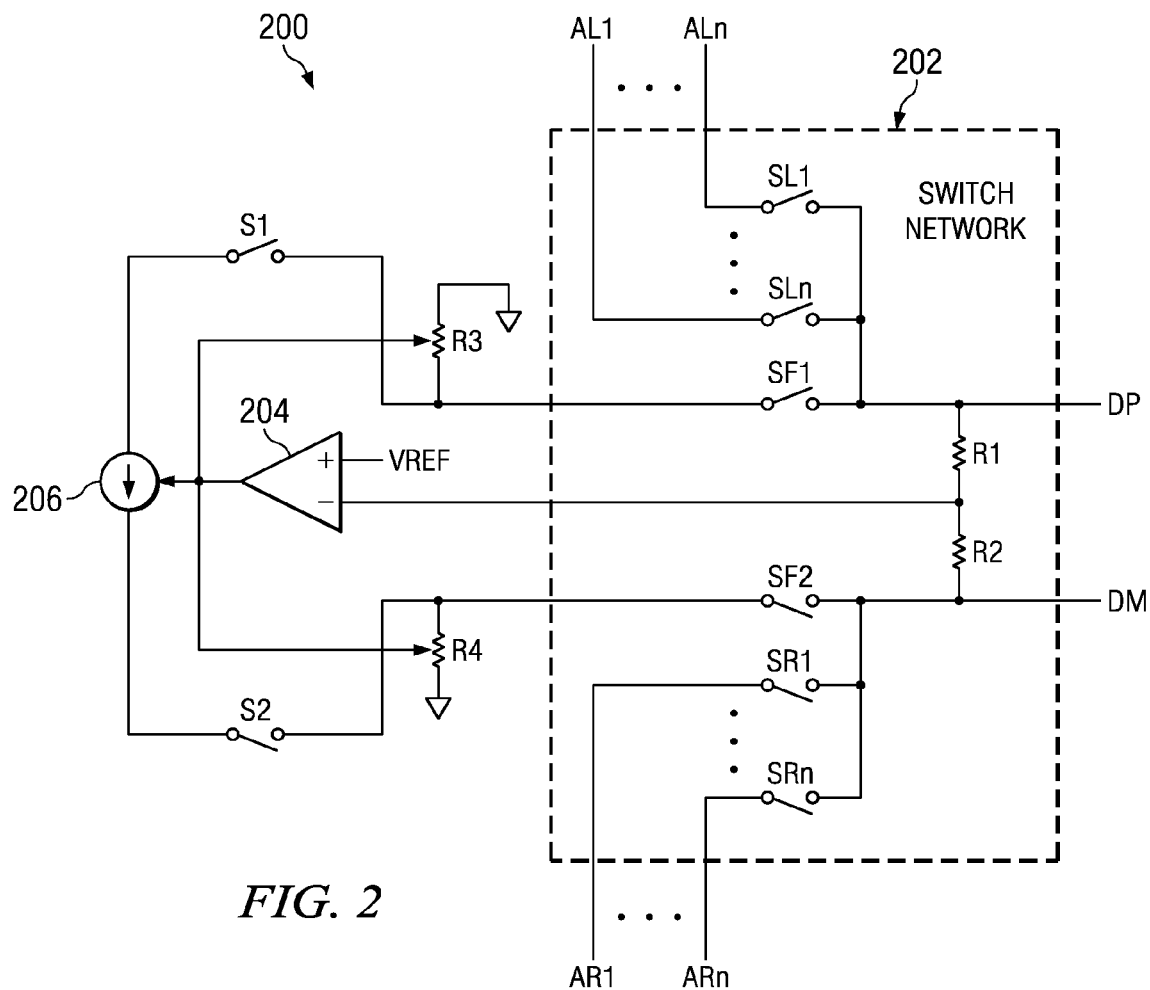
FIG. 2 is a circuit diagram of at least a portion of the switch matrix of FIG. 1.

Turning to FIG. 2, the switch matrix 200 can be seen in greater detail. The switch matrix 200 generally comprises a switch network 202, amplifier 204, adjustable current source 206, switches S1 and S2, and variable resistors R3 and R4. The switch network 202 is generally comprised of resistors R1 and R2, feedback switches SF1 and SF2, and auxiliary switches SL1 through SLn and SR1 through SRn.

In operation, the switch matrix 200 is able to transfer signals from the terminals AL1 through ALn and AR1 through ARn to terminals DP and DM. As input signals are provided to the terminals AL1 through ALn and AR1 through ARn, the controller 104 can provide control signals to switch matrix 200 to actuate some combination of auxiliary switches SL1 through SLn and SR1 through SRn, which generates the differential output signal on terminals DP and DM. Resistors R1 and R2 (which are coupled between the terminals DP and DM and a common mode terminal and which generally have large values of about 5 kΩ) generate a common mode signal, which is about one-half of the single-ended voltage swing. Generally, because resistors R1 and R2 are very large, they do not typically disturb the operation of the switch matrix 200. This common mode signal is compared to a reference voltage VREF at amplifier 204 (which is generally a differential amplifier). The output of the amplifier 206 can then be used to adjust the magnitude of the current output from the adjustable current source 206 and the resistances of variable resistors R3 and R4 (which have resistances that are nominally about 45Ω). Preferably, switches S1, S2, SF1, and SF2 can be actuated to provide adjusted currents and voltages through feedback terminals to terminals DP and DM. Essentially, resistors R3 and R4 operate as USB high speed (generally about 480 Mb/s) termination resistors, which can adjusted continuously or in a discrete time loop.

Therefore, the switch matrix 200 is able to adjust the peak-to-peak voltage swing on terminals DP and DM to the desired levels. Additionally, since the switch matrix 200 can provide self-adjustments, factory calibration is generally not necessary, and the switch matrix 200 can track temperature variations and manufacturing variations.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
 a switch network having a first output terminal, a second output terminal, a plurality of input terminals, a common mode terminal, a first feedback terminal, and a second feedback terminal, wherein the switch network outputs a differential output signal though the first and second output terminals, and wherein the switch network outputs a common mode signal through the common mode terminal;
 an amplifier having a first input terminal, a second input terminal, and an output terminal, wherein the first input terminal of the amplifier is coupled to the common mode terminal so as to receive the common mode signal, and wherein the second input terminal of the amplifier receives a reference voltage;

a first variable resistor that is coupled between the first feedback terminal and ground, wherein the magnitude resistance of the first variable resistor is based at least in part on an output signal from the output terminal of the amplifier;

a second variable resistor that is coupled between the second feedback terminal and ground, wherein the resistance of the second variable resistor is based at least in part on the output signal from the output terminal of the amplifier; and an adjustable current source that is coupled between the first and second feedback terminals, wherein the magnitude of the current from the adjustable current source is based at least in part on the output signal from the output terminal of the amplifier.

2. The apparatus of claim 1, wherein the apparatus further comprises:
a first feedback switch that is coupled between the adjustable current source and the first feedback terminal; and
a second feedback switch that is coupled between the adjustable current source and the second feedback terminal.

3. The apparatus of claim 1, wherein the switch network further comprises:
a first switch that is coupled between the first output terminal of the switch network and the first feedback terminal;
a first set of auxiliary switches, wherein each switch from the first set of auxiliary switches is coupled to the first output terminal of the switch network;
a second switch that is coupled between the second output terminal of the switch network and the second feedback terminal;
a second set of auxiliary switches, wherein each switch from the second set of auxiliary switches is coupled to the second output terminal of the switch network;
a first resistor that is coupled between the first output terminal of the switch network and the common mode terminal; and
a second resistor that is coupled between the second output terminal of the switch network and the common mode terminal.

4. The apparatus of claim 3, wherein the first and second resistors are each about 5 kΩ.

5. An apparatus for communicating with an external device, the apparatus comprising:
a switch matrix that is adapted to communicate with the external device, wherein the switch matrix includes:
a switch network having the first output terminal, the second output terminal, a plurality of input terminals, a common mode terminal, a first feedback terminal, and a second feedback terminal, wherein the switch network outputs a differential output signal though the first and second output terminals, and wherein the switch network outputs a common mode signal through the common mode terminal;
an amplifier having a first input terminal, a second input terminal, and an output terminal, wherein the first input terminal of the amplifier is coupled to the common mode terminal so as to receive the common mode signal, and wherein the second input terminal receives a reference voltage;
a first variable resistor that is coupled between the first feedback terminal and ground, wherein the magnitude resistance of the first variable resistor is based at least in part on an output signal from the output terminal of the amplifier;
a second variable resistor that is coupled between the second feedback terminal and ground, wherein the resistance of the second variable resistor is based at least in part on the output signal from the output terminal of the amplifier; and
an adjustable current source that is coupled between the first and second feedback terminals, wherein the magnitude of the current from the adjustable current source is based at least in part on the output signal from the output terminal of the amplifier; and
a controller that is coupled to the switch matrix, wherein the controller provides at least one control signal to the switch network.

6. The apparatus of claim 5, wherein the switch matrix further comprises:
a first feedback switch that is coupled between the adjustable current source and the first feedback terminal; and
a second feedback switch that is coupled between the adjustable current source and the second feedback terminal.

7. The apparatus of claim 5, wherein the switch network further comprises:
a first switch that is coupled between the first output terminal of the switch network and the first feedback terminal;
a first set of auxiliary switches, wherein each switch from the first set of auxiliary switches is coupled to the first output terminal of the switch network;
a second switch that is coupled between the second output terminal of the switch network and the second feedback terminal;
a second set of auxiliary switches, wherein each switch from the second set of auxiliary switches is coupled to the second output terminal of the switch network;
a first resistor that is coupled between the first output terminal of the switch network and the common mode terminal; and
a second resistor that is coupled between the second output terminal of the switch network and the common mode terminal.

8. The apparatus of claim 7, wherein the first and second resistors are each about 5 kΩ.

9. An apparatus comprising:
a first switch that is coupled between a first differential output terminal and a first feedback terminal, wherein the first differential output terminal outputs at least a portion of a differential output signal;
a first set of auxiliary switches, wherein each switch from the first set of auxiliary switches is coupled to the first output terminal;
a second switch that is coupled between a second differential output terminal and a second feedback terminal, where the second differential output terminal outputs at least a portion of the differential output signal;
a second set of auxiliary switches, wherein each switch from the second set of auxiliary switches is coupled to the second output terminal;
a first resistor that is coupled between the first differential output terminal and a common mode terminal, wherein a common mode signal is output through the common mode terminal;
a second resistor that is coupled between the second differential output terminal and the common mode terminal;

an amplifier having a first input terminal and a second input terminal, wherein the first input terminal of the amplifier is coupled to the common mode terminal so as to receive the common mode signal, and wherein the second input terminal receives a reference voltage;

a first variable resistor that is coupled between the first feedback terminal and ground, wherein the magnitude resistance of the first variable resistor is based at least in part on an output signal from the amplifier;

a second variable resistor that is coupled between the second feedback terminal and ground, wherein the resistance of the second variable resistor is based at least in part on the output signal from the amplifier;

an adjustable current source, wherein the magnitude of the current from the adjustable current source is based at least in part on the output signal from the output terminal of the amplifier;

a first feedback switch that is coupled between the adjustable current source and the first feedback terminal; and a second feedback switch that is coupled between the adjustable current source and the second feedback terminal.

10. The apparatus of claim 3, wherein the first and second resistors are each about 5 kΩ.

* * * * *